United States Patent [19]

Bruer et al.

[11] Patent Number: 4,728,046
[45] Date of Patent: Mar. 1, 1988

[54] METHOD OF AND AGRICULTURAL MACHINE FOR PRODUCING POWER FODDER

[75] Inventors: Dirk Bruer; Hermann Garbers; Franz Heidjann, all of Harsewinkel, Fed. Rep. of Germany

[73] Assignee: Claas Ohg, Harsewinkel, Fed. Rep. of Germany

[21] Appl. No.: 880,007

[22] Filed: Jun. 30, 1986

[30] Foreign Application Priority Data

Aug. 9, 1985 [DE] Fed. Rep. of Germany ....... 3528638

[51] Int. Cl.⁴ ............................................. B02C 19/12
[52] U.S. Cl. ......................................... 241/24; 241/29; 241/101.7; 56/14.6
[58] Field of Search ...................... 56/14.6, 13.3, 13.4; 241/101.7, 24, 222, 81, 29, 158, 159, 160

[56] References Cited

U.S. PATENT DOCUMENTS

| 2,507,669 | 5/1950 | Heth | 241/101.7 X |
| 3,703,802 | 11/1972 | Wrestler et al. | 56/14.6 X |
| 3,945,178 | 3/1976 | Delfosse et al. | 56/14.6 |
| 4,597,253 | 7/1986 | Blumer et al. | 241/101.7 X |

FOREIGN PATENT DOCUMENTS 2140285  11/1984  United Kingdom ............. 241/101.7

*Primary Examiner*—Mark Rosenbaum
*Attorney, Agent, or Firm*—Michael J. Striker

[57] ABSTRACT

An agricultural machine for producing a storable power fodder of grain and stalk product comprises a device for cutting a grain containing stalk product, a device for threshing the cut product, a device for separating during the threshing a part composed of stalk and leaf fraction, a device for throwing the separated part onto a field, and a device for comminuting a remaining part composed of grains and short straw.

5 Claims, 2 Drawing Figures 4,728,046

METHOD OF AND AGRICULTURAL MACHINE FOR PRODUCING POWER FODDER

BACKGROUND OF THE INVENTION

The present invention relates to a method of and an agricultural machine for producing storable power fodder (highly nutritious fodder) from grains and stalk products.

For the purpose of producing storable power fodder it is known to cut and chop corn or grain plants before their threshing ripeness. The stalks, the leaf parts and the fruit part are chopped together and the thus produced chopped product mixture is stored. The disadvantage of this method is that in the storage too much of raw fiber fraction is contained. This disadvantage can also not be avoided completely when the stalks are cut widely over the ground. The fraction of the raw fiber in the storage is then not completely determined, so that a precise judgment as to the content of nutritious material in power fodder cannot be made.

SUMMARY OF THE INVENTION

Accordingly, it is an object of the present invention to provide a method and arrangement for producing a power fodder which avoids the disadvantages of the prior art.

More particularly, it is an object of the present invention to provide a method and arrangement for producing a power fodder which has a desired content of raw fiber.

It is also an object of the present invention to provide such an machine for performing the inventive method which is composed of known individual units are arranged in such a manner as to obtain the above highly advantageous results.

In keeping with these objects and with others which will become apparent hereinafter, one feature of the present invention resides, briefly stated, in a method of producing a storable power fodder from grain and stalk products, in accordance with which a grain-containing stalk product is cut and threshed, and during threshing a part containing stalk and leaf fractions is separated and thrown onto a field, while a remaining part composed of grains and short straw is comminuted.

It is also an object of the present invention to provide an agricultural machine which has means for cutting and threshing a grain-containing stalk product, separating means for separating during the threshing a part which contains stalk and leaf fractions to be thrown onto a field, and means for comminuting a remaining part composed of grains and short straw.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
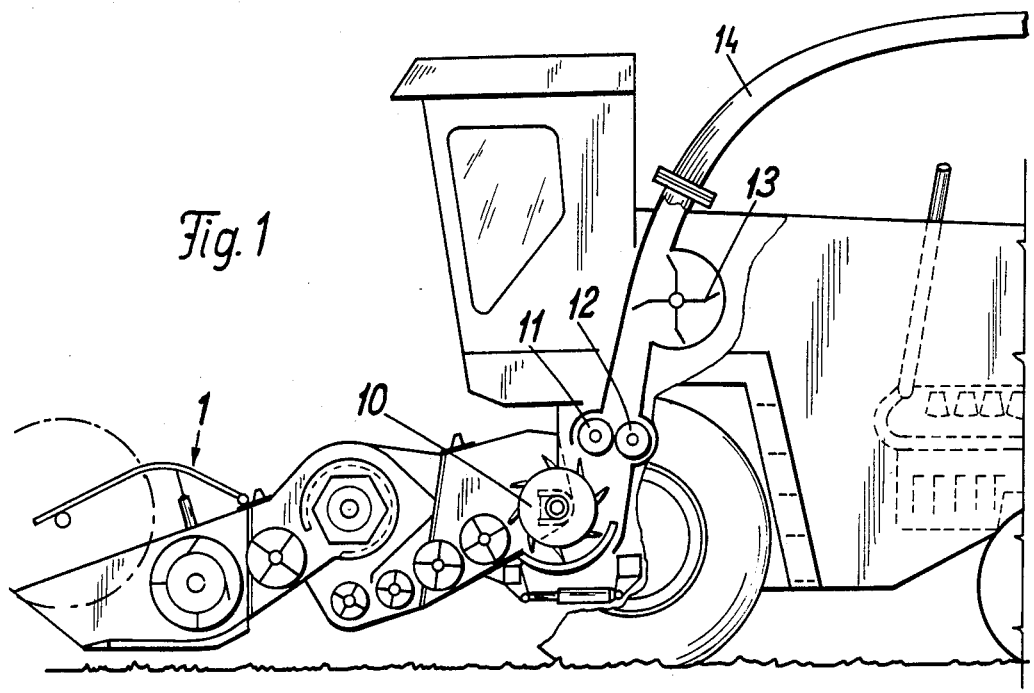
FIG. 1 is a side view showing front part of a self-propelling agricultural machine.
Figure 2:
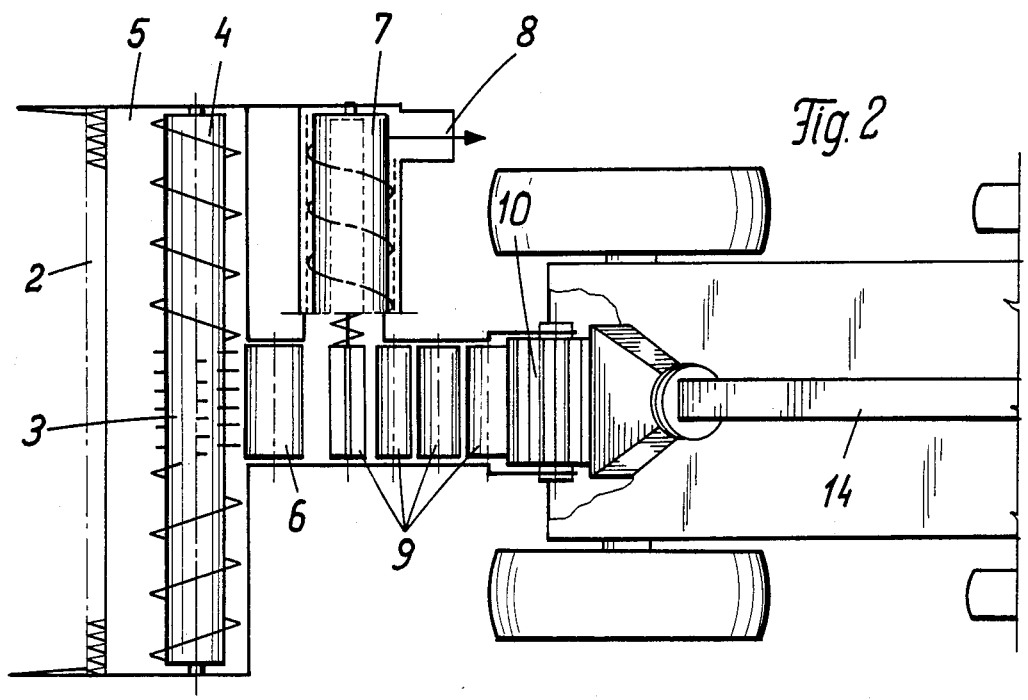
FIG. 2 is a plan view of the agricultural machine of FIG. 1.

A self-propelling agricultural machine in accordance with the present invention has a cutting mechanism which is identified with reference numeral 1. The cutting mechanism 1 includes a cutter bar 2, a drawing drum 4 provided with control fingers 3, and a cutting trough 5.

The agricultural machine further has an axial threshing and separating unit 7 located downstream of the cutting mechanism 1. A supply roller 6 is arranged between the cutting mechanism 1 and the axial threshing and separating unit 7. The threshing and separating unit 7 is provided with an outlet opening 8.

A chopper 10 is arranged downstream of the threshing and separating unit 7. Transferring rollers 9 are placed between the threshing and separating unit 7 and the chopper 10. A comminuting unit is located above the chopper 10 and includes two grooved rollers 11 and 12. The rollers 11 and 12 are driven in opposite directions. The width of a gap between the rollers 11 and 12 is adjustable.

The agricultural machine is further provided with a throwing wheel 13, and a pipe 14 which is associated with the throwing wheel and can be directed to a transporting vehicle.

The agricultural machine in accordance with the present invention operates in the following manner:

An agricultural product is cut by the cutting mechanism 1 and then the cut product is supplied from the drawing drum 4 to the axial threshing and separating unit 7 by the supply roller 6. The axial threshing and separating unit is adjusted so that an exactly defined portion of stalk and leaf product is thrown onto the field through the outlet opening 8. The remaining product stream is supplied by means of the transferring rollers 9 to the chopper 10. The chopper 10 coarsely breaks up the remaining product. The preliminary broken chopped product is supplied to the comminuting unit located above the chopper 10 or more particularly to the rollers 11 and 12. Actually this product is composed of grains and short straw, and it is comminuted by the rollers 11 and 12. The product stream to be stored is then fed by the throwing wheel 13 through the pipe 14 to a transport vehicle which travels near the agricultural machine. In this manner, a power fodder (highly nutritious fodder) is produced.

It will be understood that each of the elements described above, or two or more together, may also find a useful application in other types of constructions differing from the types described above.

While the invention has been illustrated and described as embodied in an agricultural machine for producing a storage-favorable power fodder of grains and stalk product, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing a storable power fodder of grain and stalk product, comprising the steps of cutting a grain containing stalk products; threshing the cut product and simultaneously separating from the cut product during threshing only a part composed of stalk and leaf fraction; throwing the separated part composed of the stalk and leaf fraction onto a chute; and comminuting the remaining part of the cut product, composed only of grains and short straw.

2. A method as defined in claim 1, wherein said cutting and threshing step include cutting and threshing of the grain-containing stalk product predominantly before threshing ripeness.

3. A method as defined in claim 1, wherein said comminuting step includes comminuting the remaining part composed of grains and short straw in a first step so as to comminute the same coarsely, and then in a second step so as to comminute the same finely.

4. A method as defined in claim 3, wherein said fine comminuting step includes crushing of the remaining part composed of grains and short straw.

5. A method as defined in claim 1, wherein said comminuting step includes varying in the remaining part composed of grains and short straw, the content of the short straw.

* * * * *